(12) United States Patent
Kreamer et al.

(10) Patent No.: US 12,293,614 B2
(45) Date of Patent: May 6, 2025

(54) VERIFYING MOBILE TELEMATICS WITH VEHICLE INFORMATION

(71) Applicant: Cambridge Mobile Telematics Inc., Cambridge, MA (US)

(72) Inventors: William Ryan Kreamer, Melrose, MA (US); Benjamin Bowne, Rockwall, TX (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/675,030

(22) Filed: Feb. 18, 2022

(65) Prior Publication Data

US 2023/0267773 A1    Aug. 24, 2023

(51) Int. Cl.
*G07C 5/02*    (2006.01)
*G07C 5/00*    (2006.01)
*G07C 5/08*    (2006.01)
*H04W 4/80*    (2018.01)

(52) U.S. Cl.
CPC ............... *G07C 5/02* (2013.01); *G07C 5/008* (2013.01); *G07C 5/08* (2013.01); *H04W 4/80* (2018.02)

(58) Field of Classification Search
None
See application file for complete search history.

(56) References Cited

U.S. PATENT DOCUMENTS

| 8,538,789 | B1 | 9/2013 | Blank et al. | |
|---|---|---|---|---|
| 8,653,953 | B2* | 2/2014 | Biondo | G07C 5/085 |
| | | | | 340/425.5 |
| 9,240,019 | B2* | 1/2016 | Ricci | G06T 19/006 |
| 9,609,621 | B2* | 3/2017 | Osann, Jr. | H04W 64/006 |
| 9,689,698 | B2* | 6/2017 | Wesselius | H04W 4/024 |
| 10,630,723 | B1 | 4/2020 | Prasad et al. | |
| 11,072,339 | B2 | 7/2021 | Cordova et al. | |
| 11,074,769 | B2 | 7/2021 | Balakrishnan et al. | |
| 2011/0077816 | A1* | 3/2011 | Biondo | G07C 5/008 |
| | | | | 701/31.4 |
| 2013/0344856 | A1* | 12/2013 | Silver | G06F 16/24578 |
| | | | | 455/418 |

(Continued)

OTHER PUBLICATIONS

International Search Report and Written Opinion in International Appln. No. PCT/US2023/062807, mailed on Jul. 20, 2023, 14 pages.

*Primary Examiner* — Paul S Schwarzenberg
(74) *Attorney, Agent, or Firm* — Kilpatrick Townsend & Stockton LLP

(57) ABSTRACT

Systems, devices, and methods for verifying mobile telematics with vehicle information can include receiving, from a mobile device, first trip information recorded by the mobile device during a trip undertaken by a connected vehicle; in response to receiving the first trip information from the mobile device, transmitting a request for second trip information stored on the connected vehicle; receiving the second trip information; and verifying that the mobile device was in the connected vehicle based on the first trip information and the second trip information. Methods include comparing mobile device telematics information with telematics information received from a vehicle to confirm that the telematics information accumulated by the mobile device corresponds to a vehicle and a trip.

20 Claims, 8 Drawing Sheets

(56) References Cited

U.S. PATENT DOCUMENTS

| | | | |
|---|---|---|---|
| 2014/0108058 A1* | 4/2014 | Bourne | G06Q 40/08 705/4 |
| 2015/0134427 A1* | 5/2015 | Borras | G06Q 30/0284 705/13 |
| 2015/0154711 A1* | 6/2015 | Christopulos | G06Q 40/08 705/7.29 |
| 2015/0312655 A1 | 10/2015 | Balakrishnan et al. | |
| 2016/0379141 A1 | 12/2016 | Judge et al. | |
| 2018/0013873 A1* | 1/2018 | Farrell | H04W 76/10 |
| 2021/0088347 A1 | 3/2021 | Matsumura et al. | |

\* cited by examiner

VERIFYING MOBILE TELEMATICS WITH VEHICLE INFORMATION

BACKGROUND

A connected vehicle includes applications, services, and other technologies that facilitate bidirectional communication between the vehicle and other entities. For example, a connected vehicle can include different communication devices (embedded or portable) in the vehicle that facilitate in-car connectivity with other devices in the vehicle and/or connectivity to external devices, networks, applications, and services.

SUMMARY

Embodiments of the present disclosure include a computer-implemented method comprising receiving, from a mobile device, first trip information recorded by the mobile device during a trip undertaken by a connected vehicle; in response to receiving the first trip information from the mobile device, transmitting a request for second trip information stored on the connected vehicle; receiving the second trip information; and verifying that the mobile device was in the connected vehicle based on the first trip information and the second trip information.

Embodiments of the present disclosure include one or more non-transitory computer-readable storage media comprising instructions that, when executed, cause one or more hardware processors to perform operations including receiving, at a server and from a mobile device, first trip information recorded by the mobile device during a trip undertaken by a connected vehicle; in response to receiving the first trip information from the mobile device, transmitting a request for second trip information stored on the connected vehicle; receiving the second trip information; and verifying that the mobile device was in the connected vehicle based on the first trip information and the second trip information.

Embodiments of the present disclosure include a system that includes a mobile device and a connected vehicle. The mobile device includes one or more hardware processors, and a memory for storing first telematics information about a trip, the memory comprising instructions that when executed cause the one or more hardware processors to perform operations including storing, during the trip, first telematics information about the trip, the first telematics information comprising first position information and first time stamp, and sending the first telematics information to a server at a predetermined point in the trip. The connected vehicle includes one or more hardware processors, and a memory for storing second telematics information about the trip and vehicle information, the memory comprising instructions that when executed cause the one or more hardware processors to perform operations that include receiving a request for the second telematics information, the second telematics information comprises a second position and a second time stamp; and reporting the second telematics information.

In some implementations of the embodiments, verifying that the mobile device was in the connected vehicle during the trip includes determining that at least some of the first trip information matches with at least some of the second trip information.

In some implementations of the embodiments, the first trip information comprises a first position and a first timestamp and the second trip information comprises a second position and a second time stamp. The method further includes comparing the first position and the first timestamp against the second position and the second time stamp; and determining that the first position and the second position are substantially similar; determining that the first timestamp and the second timestamp are substantially similar; and verifying that the mobile device and the connected vehicle were at the substantially same position at a time corresponding to the first and second timestamps.

In some implementations of the embodiments, the first trip information comprises a distance traveled by the mobile device during the trip and the second trip information comprises an odometer reading for the connected vehicle for the trip. The method can include comparing a distance traveled by the mobile device during the trip against the odometer reading; determining that the distance traveled by the mobile device during the trip is substantially the same as the odometer reading; and determining that the mobile device was in the connected vehicle during the trip based on the comparison of the distance traveled by the mobile device and the odometer reading being substantially the same.

In some implementations of the embodiments, the first trip information comprises an indication of a Bluetooth device the mobile device was connected to during the trip and the second trip information comprises an indication of a Bluetooth device the connected vehicle was connected to during the trip. The method can include determining that the mobile device was in the connected vehicle based on the mobile device being connected to the connected vehicle via a Bluetooth connection during the trip.

In some implementations of the embodiments, transmitting a request for second trip information stored on the connected vehicle comprises transmitting the request for the second trip information to the connected vehicle.

In some implementations of the embodiments, the second trip information is received from the connected vehicle.

In some implementations of the embodiments, the second trip information is received from the mobile device.

In some implementations of the embodiments, the method can also include determining driving behavior of a driver of the connected vehicle based on one or more of the first trip information and the second trip information.

In some implementations of the embodiments, the first telematics information comprises a distance the mobile device travelled during the trip; and wherein the second telematics information comprises an odometer reading for the trip.

In some implementations of the embodiments, the first telematics information comprises an indication of a Bluetooth device that the mobile device was connected to during the trip; and wherein the second telematics information comprises an indication of a Bluetooth device the connected vehicle was connected to during the trip.

In some implementations of the embodiments, the first telematics information comprises an indication of an owner or authorized user of the mobile device; and wherein the second telematics information comprises an indication of a vehicle identification number (VIN) of the connected vehicle.

In some implementations of the embodiments, receiving the for the second telematics information comprises receiving the request from a remote server.

BRIEF DESCRIPTION OF THE DRAWINGS

Like numerals indicate like components.

DETAILED DESCRIPTION

Figure 1:
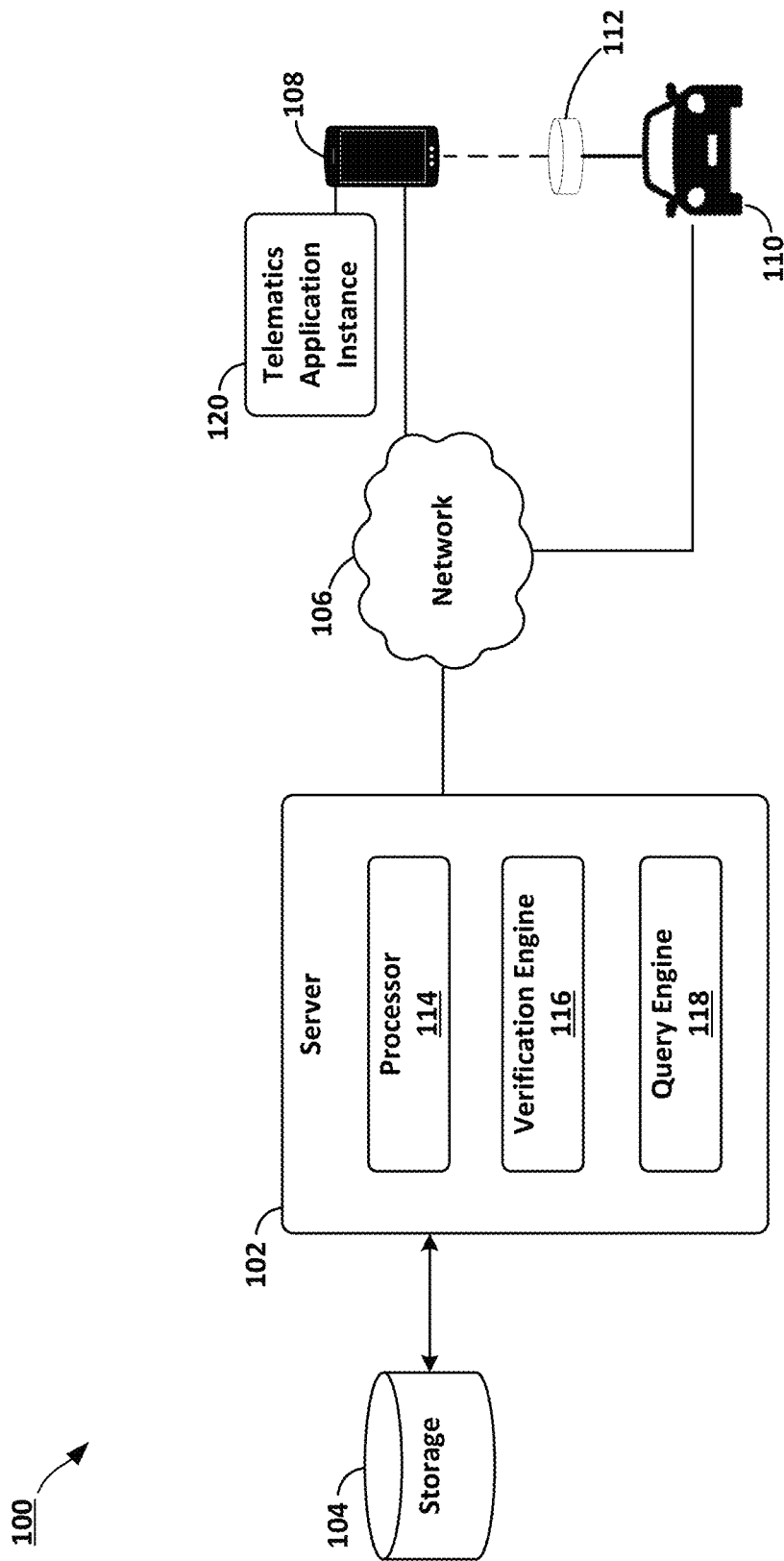
FIG. 1 is a schematic diagram illustrating an example system for verifying mobile telematics information using vehicle information in accordance with embodiments of the present disclosure.

Connected vehicles offer access to a multitude of telematics data that is relevant to driving safety and risk assessments. These data can be accessed via real-time requests to the vehicle, or by the vehicle continuously uploading the data to the cloud and storing it for later access. Today, the data available from connected vehicles includes data covering at least: Vehicle Identification Number (VIN);

Location (latitude and longitude and timestamp) derived from a Global

Positioning System (GPS) (or Global Navigation Satellite System (GNSS) and recorded at key events or continuously during a drive;

Vehicle speed derived from GPS and/or wheel-speed sensors and recorded at key events or continuously during a drive;

Acceleration derived from Inertial Measurement Unit (IMU) sensors attached to the vehicle's frame, and recorded at key events or continuously during a drive;

Distance traveled by the vehicle derived from an Odometer and recorded at key events;

Data indicative of whether the vehicle's ignition in on/off (and/or times when the vehicle's ignition is turned on/off);

Data on airbag deployment;

Fuel usage or charge usage for an electric vehicle;

Engine temperature; and

Data on advanced features including Anti-lock Braking System, Forward Collision Avoidance, Lane Departure Warning, In-Cabin Camera, Adaptive Cruise Control, Driver Attentiveness/Distraction, External Temperature, etc.

Connected vehicles represent a proliferation of new data streams that are useful for evaluating driver behavior and assessing risk factors. The connected vehicles can upload telematics and other useful information to servers and/or cloud platforms. The telematics and other useful information can include low-rate event data (e.g., ignition on/off) and high-rate multimedia (e.g., video/sound from multiple cameras). The wireless networks available today do not provide a cost-effective means to transfer all of this data from the vehicle to remote servers or the cloud.

Mobile devices are another source of telematics data that drivers often carry on their person while driving. Mobile devices can record the trajectory of the mobile device (e.g., location, speed at 1-second intervals, and acceleration at much higher sampling rates). Mobile devices, however, typically do not provide direct information that can identify the vehicle.

This disclosure describes techniques for correlating telematics information accumulated by a mobile device during a trip with vehicle information to verify that the telematics information uploaded by the mobile device is for a trip undertaken by that vehicle and, in some cases, by a particular driver.

Coincident mobile device telematics data collection offers a solution to the sampling challenge. The mobile device records the trajectory of the device (e.g., location, speed, timestamp) throughout a trip, and typically uploads the recorded data to the cloud immediately after the trip ends (e.g., via a telematics application instance running on the mobile device). Because the mobile device data is uploaded immediately after the trip ends, the cloud system has the opportunity to immediately query the associated connected vehicle to request that vehicle's last-known location. This is an opportune time to request the vehicle's last-known location because it facilitates a data association assessment between the mobile phone and the connected vehicle, and at the same time disposes of the need to continually request the vehicle's location throughout the day, thereby minimizing the number of requests to the connected vehicle.

In some embodiments, the mobile device can upload telematics information periodically or at predetermined milestones (such as points in time, miles driven, etc.), as opposed to only at the end of a trip. The mobile device can upload information at the start of the trip, during the trip, and at the end of the trip. The information uploaded can be aggregated or otherwise processed to determine if the mobile phone information corresponds to the trip. The receiving of telematics information from the mobile device can prompt the server to query the connected device. A user can also push mobile device information to the server manually.

In some embodiments, when the mobile device determines that it should upload telematics information, the mobile device itself can query the connected vehicle, and the mobile device can upload the vehicle's information to the server in addition to the information accumulated by the mobile device.

FIG. 1 is a schematic diagram illustrating an example system for verifying mobile telematics information using vehicle information in accordance with embodiments of the present disclosure. The system 100 includes server 102, a storage system 104, a network 106, a mobile device 108, and a connected vehicle 110. The storage system 104 includes one or more computer-readable storage mediums configured to receive and store sensor information and other information for verifying that telematics information uploaded by a mobile device corresponds to a specific vehicle and for performing assessments of driving behavior and risk using those telematics data.

A trip can include, for example, any instance of travel from an origin to a destination. In some cases, a trip is an instance involving a single transportation mode (e.g., a car) or a single role of a person being transported (e.g., a driver) or both. For example, a trip may be an instance of travel from a home to a store in a car. The driver of the car can have a mobile device 108 that includes a telematics application. During a trip, the telematics application can be running as a telematics application instance 120 on mobile device 108.

The mobile device 108 can accumulate vehicle telematics information during the trip while telematics application instance 120 is running. The mobile device 108 can communicate the accumulated telematics information to server 102 through network 106 at the end of a trip or at predetermined intervals or milestones. The mobile device 108 can receive vehicle telematics information from a variety of sources, including from sensors associated with the mobile device 108 itself, sensors associated with the vehicle, sensor tags 112, after-market sensors, vehicle diagnostics information, vehicle processor register information, satellite receivers, etc. The mobile device 108 can include a sensor suite, which is described in more detail in FIG. 4.

The server 102 can include one or more hardware processors 114. Server 102 can include verification engine 116. Verification engine 116 can perform verification tasks, such as verifying location coincidence between the mobile device and the connected vehicle and verifying trajectory information from telematics information obtained from the mobile device and the connected vehicle.

The telematics information and vehicle information can be stored in storage 104. Storage 104 is associated with server 102 or can be distributed or cloud-based storage. The storage 104 can include non-transitory computer-readable media storing instructions that when executed cause the one or more hardware processors 114 to verify that a mobile device was in a connected vehicle during a trip, to determine that the telematics information accumulated by the mobile device during the trip presents driving behavior for the trip.

Generally, telematics information includes information from vehicle GPS systems, onboard vehicle diagnostics, wireless telematics devices (e.g., tags), onboard sensors, mobile device sensors, and black box technologies to record and transmit vehicle data, such as speed, location, maintenance requirements and servicing, and cross-reference this data with the vehicle's internal behavior.

Generally, sensor information (or sensor data) refers broadly to information that is sensed by a sensor. The sensor can be part of the vehicle, such as on-board cameras or LiDAR systems. The sensor can be part of the mobile device, such as a magnetometer or satellite receiver. The sensor can be part of a sensor tag 112 that is attached to the vehicle, which can include a gyroscope or an accelerometer. In some embodiments, an external sensor can be individually attached to the vehicle and communicatively coupled to the mobile device 108, so that information sensed by the external sensor can be sent to the mobile device 108. An example of an external sensor can be an after-market dashcam. As another example, an external sensor can be part of a device described in U.S. Pat. No. 11,074,769, filed May 9, 2019, the contents of which are incorporated by reference in their entirety herein.

Network 106 can include any type of data network that facilitates the communication of information between mobile device 108 and server 102. For example, network 106 can be a cellular network, a Wi-Fi connection to the Internet, or other type of network.

Figure 2:
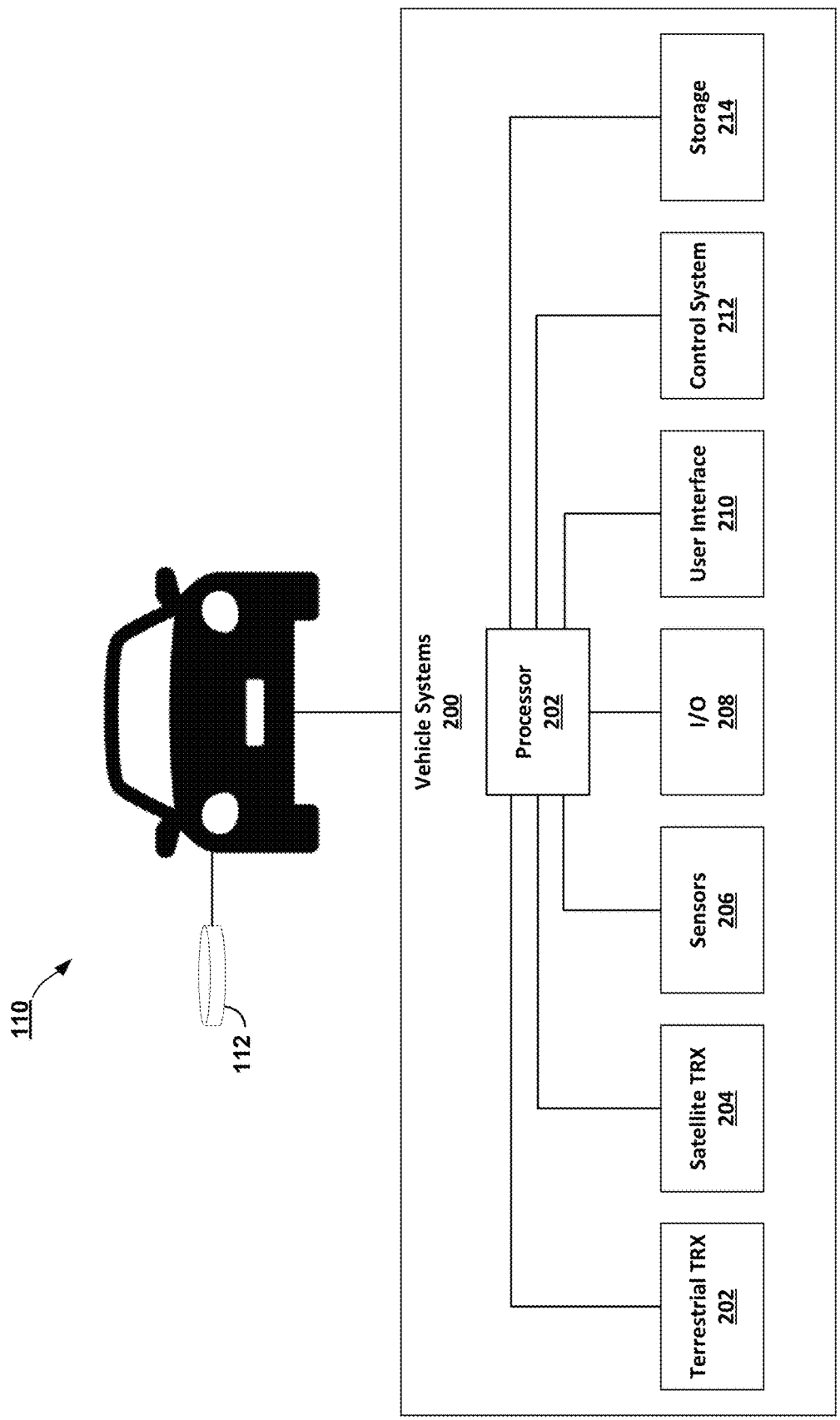
FIG. 2 is a schematic diagram of an example connected vehicle in accordance with embodiments of the present disclosure.

FIG. 2 is a schematic diagram of an example connected vehicle 110 in accordance with embodiments of the present disclosure. Connected vehicle 110 can include vehicle systems 200. Vehicle systems 200 can include various system components that allow the connected vehicle to collect information about the vehicle, the vehicle's location, trajectory, on-board systems, and other information. One or more processors 202 can control various features on the vehicle.

The vehicle systems 200 can include one or more sensors 206. Sensors 206 can include any type of sensor that can collect information about the vehicle, the driver, the trip, the environment, etc. For example, the vehicle 110 can include an accelerometer, a speedometer, an odometer, a pressure sensor, on-board cameras, thermometers, tire-pressure sensors, fluid level and temperature sensors, eye gaze tracking sensors, gyroscopes, and other sensors. Sensors 206 can also include sensors that support advance driver assistance systems (ADAS).

Vehicle systems 200 include input/output (I/O) interface 208. I/O interface 208 can include ports for communications and power, such as Universal Serial Bus (USB) ports. A driver might plug a mobile device into a USB port to play music, use maps and navigation services, send and receive calls and text messages, etc. The I/O interface provides a way for the driver (and others) to interact with the connected vehicle 110, charge devices, establish communications points, etc.

The vehicle systems 200 also includes a user interface, such as a graphical user interface (GUI). The user interface 210 can provide an interface for the driver or passenger to provide information to the connected vehicle 110 or read information from the connected vehicle 110. A driver might plug a mobile device 108 into a USB port and launch a telematics application instance prior to starting a trip. The user interface 210 can display the information from the telematics application instance to the driver.

The vehicle systems 200 includes a control system 212. Control system 212 can manage various operational features of the vehicle, from ignition to power management, engine or motor control, air conditioning, ADAS, etc.

Storage 214 can store various data. Storage 214 can include flash storage, but can also include cache memory, registers, and other types of memory. Storage 214 can store telematics information and other information received from sensors. Storage 214 can also store vehicle identification information, driver information, vehicle status, ownership information, and other information.

In addition, vehicle systems 200 includes communications components for communicating with mobile devices, remote servers, satellites, etc. For example, connected vehicle 110 includes a terrestrial transceiver 202. Terrestrial transceiver 202 can include, but is not limited to, any communication protocol for terrestrial communications, such as Wi-Fi, cellular, Bluetooth, RF, light-based communications, or other type of terrestrial communications. Vehicle system 200 can also include a satellite transceiver 204. Satellite transceiver 204 can be used to support global navigation satellite systems (GNSS), such as global positioning system (GPS) or other satellite-based location systems. In some embodiments, satellite transceiver 204 can be used for communicating information to remote servers through a satellite communications relay.

The connected vehicle 110 can use terrestrial transceiver 202 to communicate telematics information and other information about the trip and/or the connected vehicle 110 to a remote server 102 based on receiving a prompt or query from the remote server 102. In some embodiments, the connected vehicle 110 can send telematics information and other information about the trip and/or the connected vehicle 110 to a remote server based on receiving a prompt or query received from a mobile device 108. In some embodiments, the connected vehicle 110 can send telematics information and other information about the trip and/or the connected vehicle 110 to the mobile device 108 based on receiving a prompt or query from the remote server or from the mobile device 108.

Figure 3:
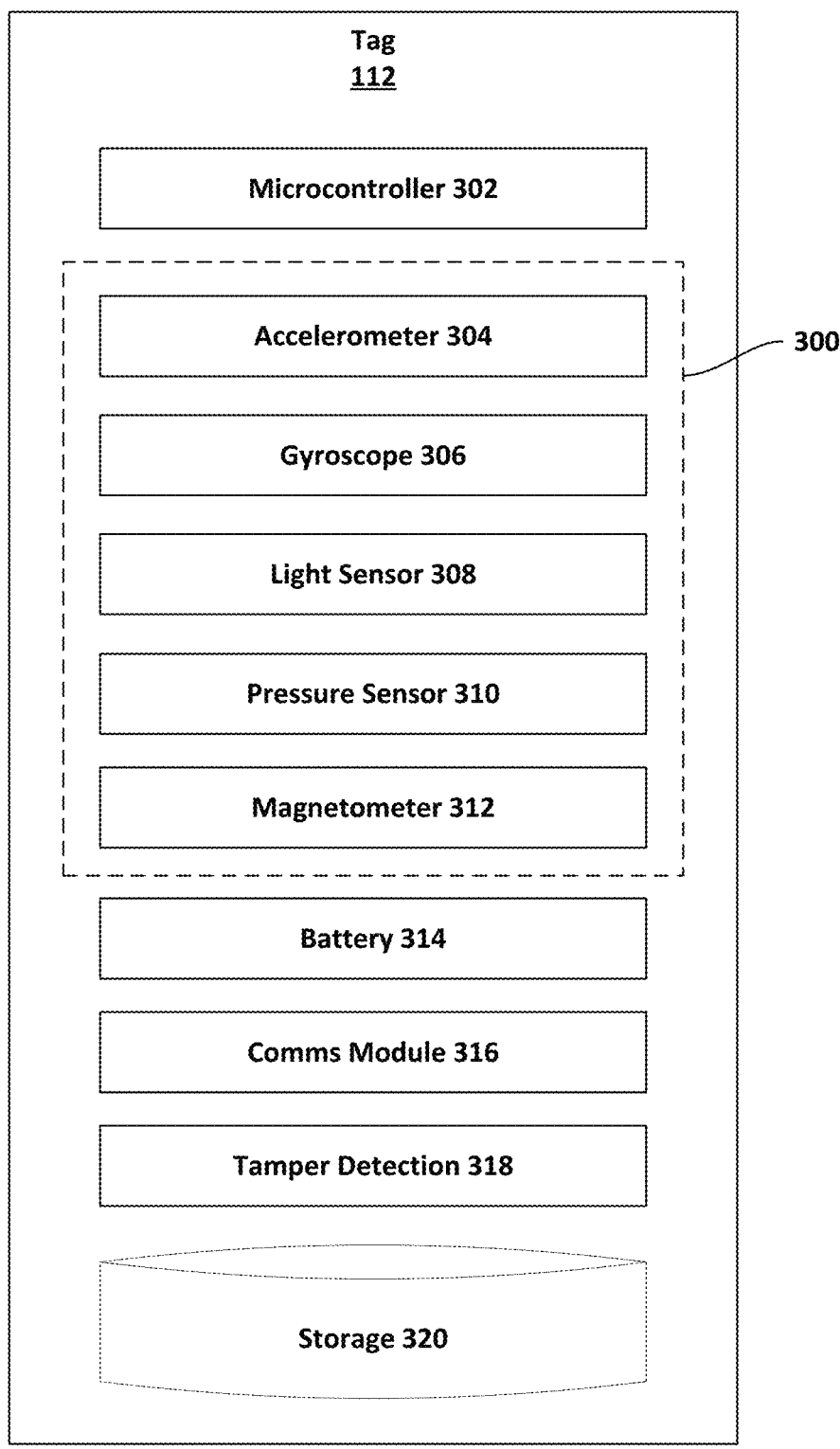
FIG. 3 is a schematic diagram of an example sensor tag in accordance with embodiments of the present disclosure.

Connected vehicle 110 can include a sensor tag 112. FIG. 3 is a schematic diagram of an example sensor tag 112 in accordance with embodiments of the present disclosure. The tag 112 contains a processor in the form of a microcontroller 302 capable of executing programmed instructions (e.g., software or firmware), which controls the operation of the various other components of the tag. The components include a communications module 312. Communications module 312 can include a low-power wireless communication module to communicate with a mobile device 108 in the vehicle. In some embodiments, the tag 112 can also be connected to the vehicle 110 or mobile device 108 through a wired connection, such as through a USB cable.

It will be appreciated that the mobile device 108 could be any suitable mobile communications device such as a mobile telephone, a tablet, an iPod or any other suitable communications device. In any event, the components of the tag 112 include a sensor suite 300. Sensor suite 300 can include one or more of a three-axis accelerometer 304, and optionally one or more among a three-axis gyroscope 306, a light sensor 308, a pressure sensor 310, and/or a magnetometer 312.

The accelerometer 304 measures the acceleration of the tag 112 and thereby of the connected vehicle 110 when the connected vehicle is on a trip and reports the data to the microcontroller 302. The accelerometer 304 and other sensors of sensor suite 300 provide digital output generally via a serial interface standard or wireless interface standard.

The tag 112 includes a battery 314 for providing power to the device. The battery may be in a coin cell form factor, standard AAA or AA, or solar. In some embodiments, the tag is not tethered to any wired source of power, such as the vehicle's electrical power supply or the vehicle's standard on-board diagnostic (OBD) port or to a mobile device 108. Because it does not have an unbounded source of energy, the tag's operation includes methods to use energy frugally and carefully, as described below.

In an embodiment, the components in the tag 112 are low-power devices, so that one or two small coin-cell batteries suffice for the tag to run for several thousands of hours of driving time (e.g., multiple years of operation). The firmware of the microcontroller 302 on the tag 112 records telematics data mostly only when the vehicle is moving. When the vehicle is not moving, the components of the tag 112 are in powered-down or in an ultra-low-power idle state. An "acceleration state machine" can control the different power states of the tag 112.

The advantages of not requiring a tethered power source are that there is no complicated or cumbersome installation procedure as with an installed black box. Plugging the tag into the vehicle's OBD port is also not desirable given that these types of devices could potentially interfere with the vehicle's on-board systems. The capital and operational costs of a telematics system with the untethered tag are considerably lower than black boxes and OBD devices and are more scalable for insurance telematic companies.

The tag 112 records acceleration and other sensor data. The tag 112 streams that data to the mobile device 108 over the short-range wireless communication link, which will in turn process that data and transmit at least a portion of the received and processed data via a wireless communications network 106 such as 802.11 (WiFi) or cellular network to a server 102 with an associated storage system 104. As mentioned before, in some embodiments, the tag 112 can be connected to mobile device 108 or connected vehicle 110 by a wired connection.

The tag 112 includes data storage 320 in the form of a flash storage, for example using a serial flash memory. The data storage 320 stores data about trip start/end times, acceleration and other sensor data including telematic events detected by the firmware such as hard braking, accelerations, and turns, unexpected movements of the tag, collisions or crashes, and debugging logs together with time stamps. The tag 112 also includes random access memory (RAM) used by the firmware and read-only memory (ROM) used to store configuration data and executable instructions.

In the illustrated example, the communications module 316 can include a short range wireless communications protocol, such as Bluetooth, but any low-power communication could be used. Bluetooth Low Energy (BLE) meets the desired power requirements and is widely available on commodity smartphone devices. In an example embodiment the microcontroller 302 and communications module 316 including antenna and crystal are combined in a single chip.

The tag 112 includes a tamper detection mechanism 318. Tamper detection can aid in verification that sensor information from a trip can be correlated to a connected vehicle. The tamper detection mechanism 318 can use one or both of the following two methods. The first method uses the accelerometer and using an orientation algorithm where the tag 112 once secured to the vehicle will have knowledge of its correction angle in relation to the vehicle travelling direction. This algorithm computes the rotation matrix that converts from the axes of the tag's accelerometer to the axes corresponding to the vehicle's frame of reference. Should the tag 112 experience any sudden changes in this orientation the most likely reason is a movement of the affixed tag, which would be considered tampering. This tampering event will be recorded in the tag flash memory and transmitted securely to the backend server. The detection of such tampering reduces potential fraud.

The second method uses a light sensor chip included in the tag 112, which will be covered by the tag housing. When removing the tag from its intended position, the piece of the housing will be broken, and the light sensor will be exposed. This, in turn, will trigger a tamper event, which will be transmitted to the data storage 302 and then sent via the mobile device 108 to the server 102.

Further disclosure regarding sensor tag 112 for obtaining telematics information during trip can be found in U.S. patent application Ser. No. 14/529,812, filed Oct. 31, 2014, the contents of which are incorporated by reference in their entirety herein.

Figure 4:
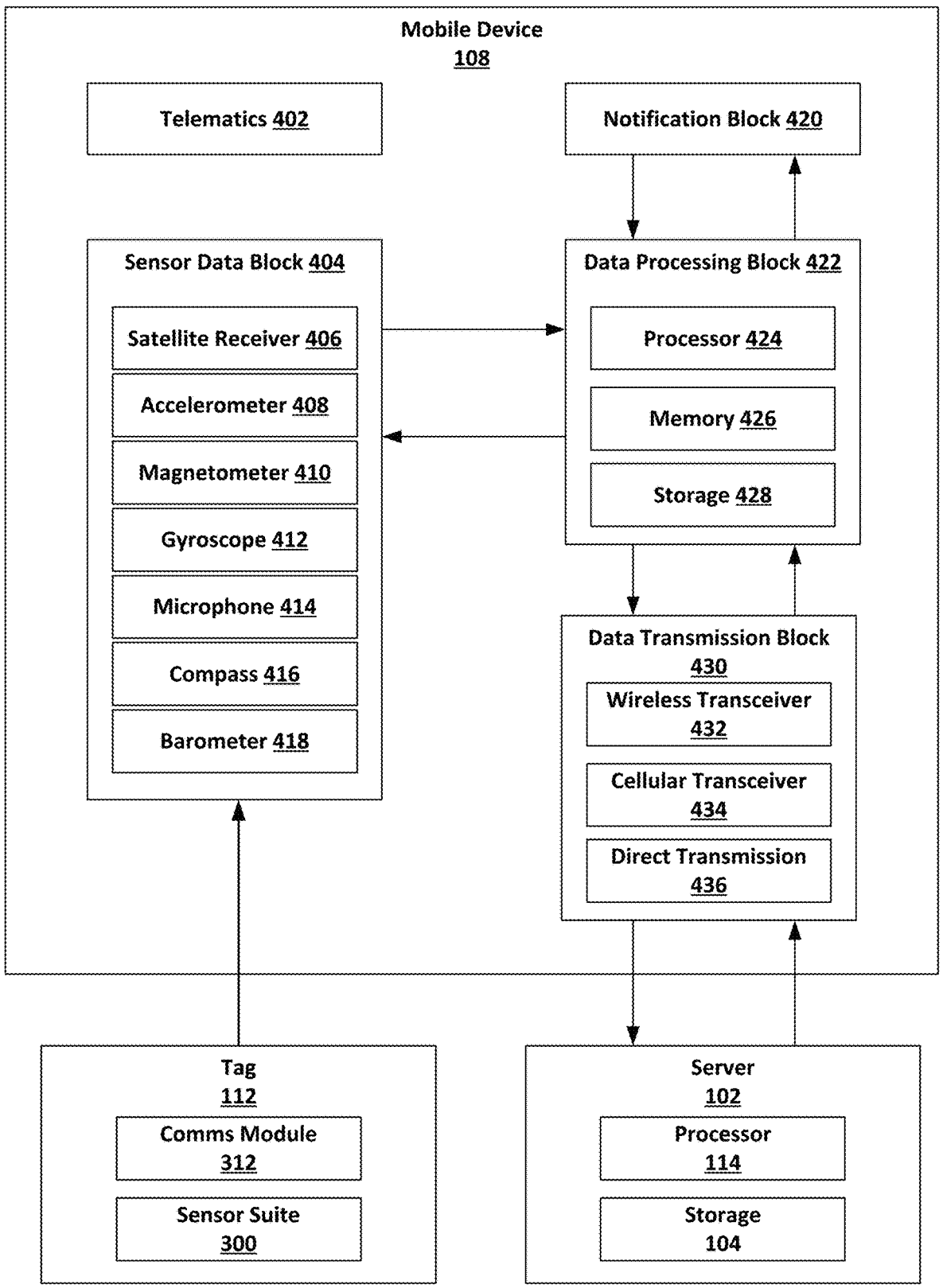
FIG. 4 is a schematic diagram of an example mobile device in accordance with embodiments of the present disclosure.

FIG. 4 is a schematic diagram of an example mobile device 108 in accordance with embodiments of the present disclosure. Mobile device 108 having a number of different components. Mobile device 108 may include a sensor data block 404 (sensor suite 404), a data processing block 422, a data transmission block 430, and optionally a notification block 420. The sensor data block 404 includes data collection sensors as well as data collected from these sensors that are available to mobile device 108. This can include external devices such as tag 112 connected via Bluetooth, USB cable, etc. The data processing block 422 includes storage 126, and manipulations done to the data obtained from the sensor data block 404 by processor 122. This may include, but is not limited to, analyzing, characterizing, subsampling, filtering, reformatting, etc. Data transmission block 130 may include any transmission of the data off the mobile device 108 to an external computing device that can also store and manipulate the data obtained from sensor data block 404. The external computing device can be, for example, a server 102. Server 102 can include a processor 114 and can access storage 104. Notification block 140 may report the results of analysis of sensor data performed by the data processing block 422 to a user of the mobile device 108 via a display (not shown). For example, notification block 420 may display or otherwise report a trip status, a query notification status, a location, a prompt, or other information to a user of the mobile device 108.

Some embodiments are described using examples where driving data is collected using mobile devices 108, and these examples are not limited to any particular mobile device. As examples, a variety of mobile devices including sensors such as location determination systems such as global positioning system (GPS) receivers 406, accelerometers 408, magnetometer 410, gyroscopes 412, microphone 414, compasses 412, barometers 418, communications capabilities, and the like are included within the scope of the disclosure. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect telematics data associated with the driving behavior of a driver, one or more sensors on mobile device 108 (e.g., the sensors of sensor data block 404) are operated close in time to a period when mobile device 108 is with the driver when operating a vehicle (e.g., during a "drive" or a "trip." With many mobile devices 108, the sensors used to collect data are components of the mobile device 108, and use power resources available to mobile device 108 components, e.g., mobile device battery power and/or a data source external to mobile device 108.

Some embodiments use settings of a mobile device to enable different functions described herein. For example, in Apple IOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing. In some implementations, alerts are provided or surfaced using notification block 420 while the app is running in the background since the trip capture can be performed in the background. These alerts may facilitate driving behavior modification. Further disclosure regarding mobile devices for obtaining telematics information during trip can be found in U.S. Pat. No. 11,072,339, filed Jun. 6, 2017, the contents of which are incorporated by reference in their entirety herein.

In embodiments, the mobile device 108 can run a telematics application instance that is started up prior to the start of a trip. When the telematics application instance is launched or when instructed by a user, the mobile device 108 can begin tracking telematics information about the trip, including recording a position and time for the start of the trip. During the trip at certain intervals or milestones or distances, including at the end of the trip, the mobile device 108 can upload telematics information to remote server 102. Telematics information can be accumulated from sensors and other components of the mobile device 108 and/or from sensor tag 112, if present. In some embodiments, the mobile device 108 can be instructed to upload information to the remote server 102 on command.

In some embodiments, the uploading of telematics information by the mobile device 108 causes the server 102 to query the connected vehicle 110 for telematics information and other information. In some embodiments, the server 102 can request the mobile device 108 to query the connected vehicle 110 for the telematics information and other information. The connected vehicle 110 can send the telematics information and other information directly to the server 102 or back to the mobile device 108. If the connected vehicle 110 sends the telematics information and other information to the mobile device 108, the mobile device 108 can package the connected vehicle's telematics information and other information and send to the server 102.

Figure 5:
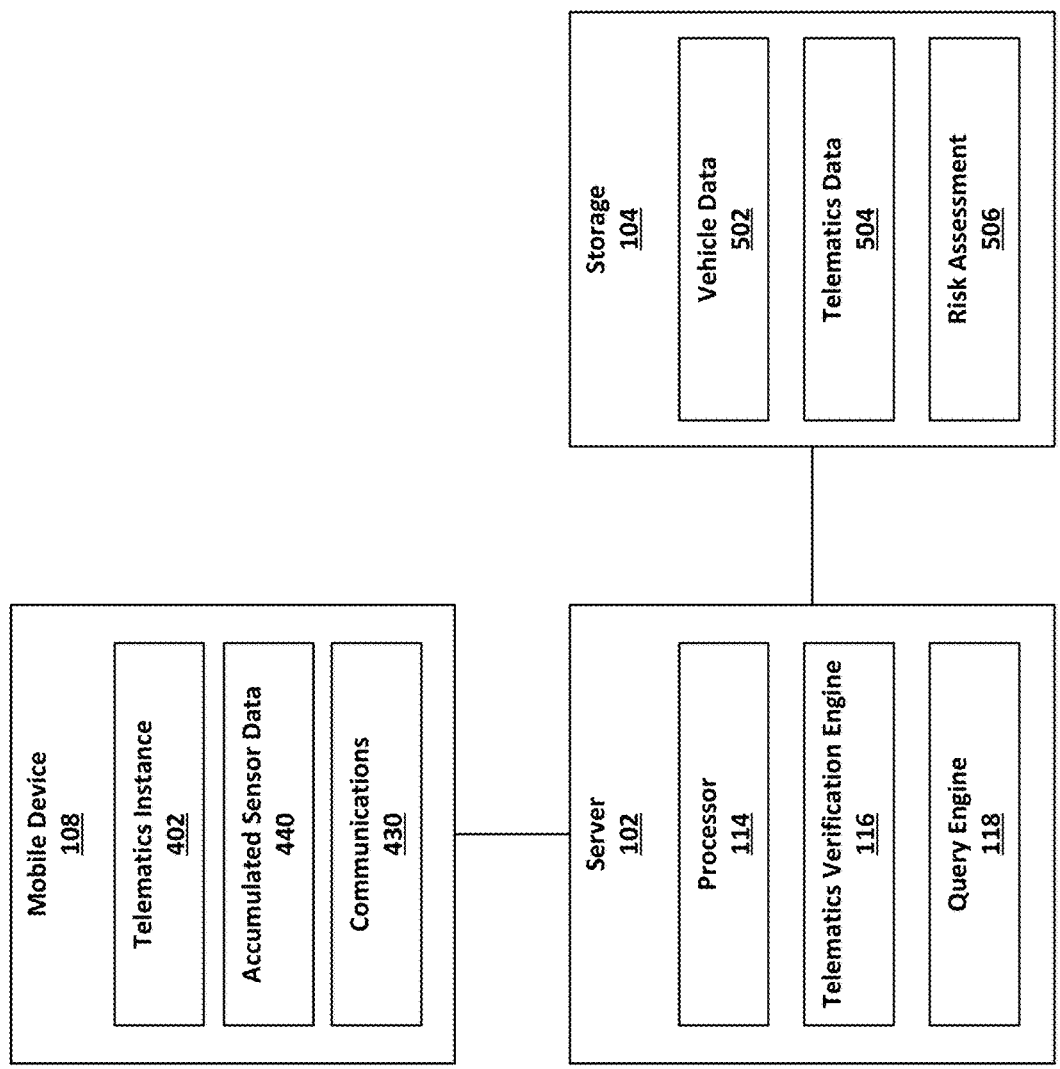
FIG. 5 is a schematic diagram of a server for collecting and processing telematics data from a trip in accordance with embodiments of the present disclosure.

FIG. 5 is a schematic diagram of a server 102 for collecting and processing telematics data from a trip in accordance with embodiments of the present disclosure. Server 102 that communicates with mobile device 108. In some embodiments, server 102 may provide functionality using software components including, but not limited a telematics verification engine and a communications engine 118. These components may include instructions that are executed by one or more hardware processors 114 and kept in non-transitory computer readable media to perform one or more operations. Server 102 may also access data storage 104. Data storage 104 can store vehicle data 502, telematics data 504, and risk assessment scores 506. Data storage 104 can store telematics information from current or previous trips, driver behavior scores and risk assessments, vehicle information such as vehicle identification information, driver information, and other information. It is important to note that, while not shown, one or more of the components shown operating within server 102 can operate fully or partially within mobile device 108, and vice versa.

To collect data associated with the driving behavior of a driver, one or more sensors on mobile device 108 (e.g., the sensors of sensor data block 404) may be operated close in time to a period when mobile device 108 is with the driver during a drive or trip. Once the mobile device sensors have collected data (and/or in real time), some embodiments analyze the data to determine acceleration vectors for the vehicle, as well as different features of the drive.

The verification engine 116 can receive, from a mobile device 108, position information with timestamp information at a point in a trip that a connected vehicle 110 is taking. Based on receiving the position information (and timestamp), the query engine 118 can query the connected vehicle 110 (or ask the mobile device 108 to query the connected vehicle 110) for telematics information, including position and timestamp information for the connected vehicle and for a time that substantially corresponds to the timestamp information received by the mobile device 108. The verification engine 116 can also verify, probabilistically, that the telematics information collected by and received from the mobile device 108 corresponds to a trip undertaken by the connected vehicle 110. The server 102 can then perform other operations using the telematics information, such as characterizing driving behavior and assessing risk.

As discussed herein, some embodiments can transform collected sensor data (e.g., driving data collected using sensor data block 404) into different results, including, but not limited to, analysis of braking behavior, analysis of acceleration behavior, estimates of the occurrence of times where a driver is speeding ("speeding behavior"), analysis of steering behavior, and estimates of the occurrence of times where a driver was distracted (e.g., "mobile device usage behavior"). Examples of collecting driving data using sensors of a mobile device are described herein. Examples of analyzing collected driving data to detect driving behaviors are also described herein. Although some embodiments are discussed in terms of certain behaviors, the present invention is not limited to these particular behaviors and other driving behaviors are included within the scope of the present invention. The driving behaviors may be used to assign a driving score to a trip or to a plurality of trips based on driving behaviors. Such driving scores can be used to determine risk assessments for a driver and to otherwise analyze driving behavior. Notifications of driving behavior, such as display of a driving score, can be made via notification block 140 of mobile device 108. The driving score may be used to adjust the frequency of data collected by sensor data block 404 in some embodiments. Further disclosure regarding servers for obtaining telematics information and using telematics information for assessing driving behaviors during trip can be found in U.S. Pat. No. 11,072,339, filed Jun. 6, 2017, the contents of which are incorporated by reference in their entirety herein.

Although shown and described as being contained within server 102, which can be remote from mobile device 108, it is contemplated that any or all of the components of server 102 may instead be implemented within mobile device 108, and vice versa. It is further contemplated that any or all of the functionalities described herein may be performed during a drive, in real time, or after a drive.

Figure 6:
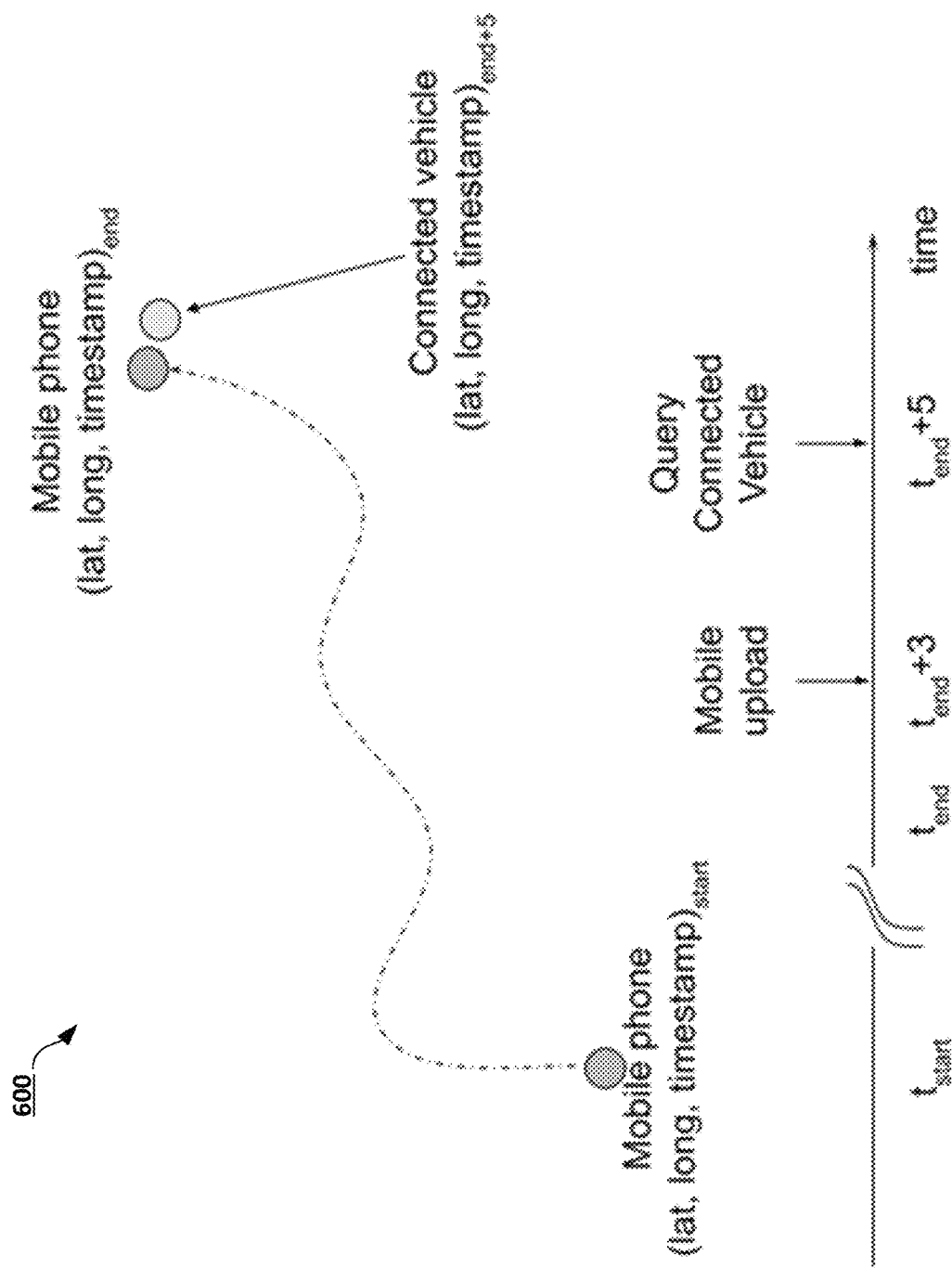
FIG. 6 is a graphical representation illustrating a correlation between mobile device location and connected vehicle location in accordance with embodiments of the present disclosure.
Figure 7:
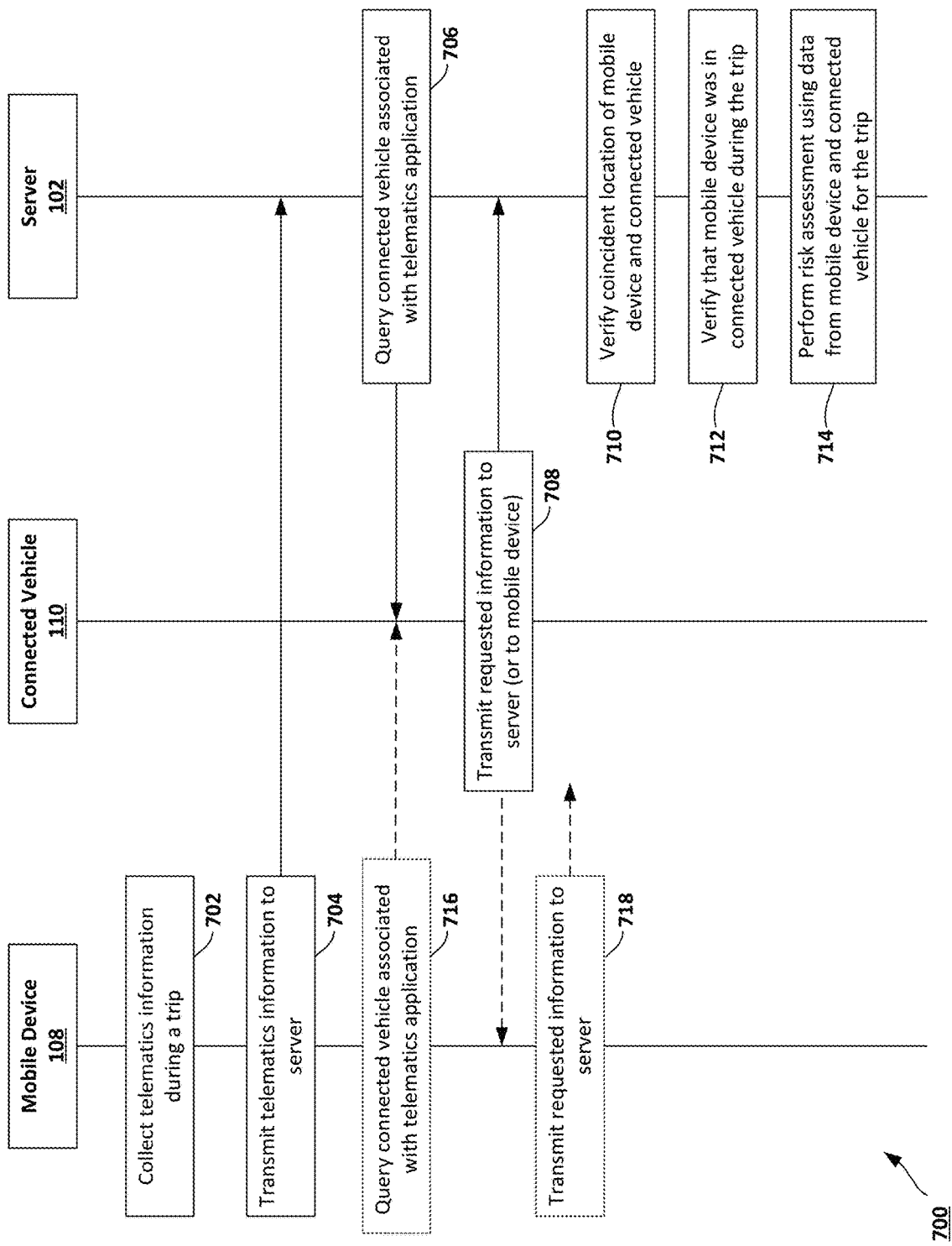
FIG. 7 is a swim lane diagram illustrating message flow for verifying that telematics data reported by a mobile device corresponds to a vehicle in accordance with embodiments of the present disclosure.

FIG. 6 is a graphical representation 600 illustrating a correlation between mobile device location and connected vehicle location in accordance with embodiments of the present disclosure. FIG. 7 is a swim lane diagram 700 illustrating message flow for verifying that telematics data reported by a mobile device corresponds to a vehicle in accordance with embodiments of the present disclosure. FIGS. 6 and 7 are described together.

This disclosure describes associating the data collected from the driver's mobile phone with data collected from the corresponding connected vehicle. This is not straightforward for several reasons: mobile phone trip data will be recorded during trips not taken in the connected vehicle. For example, a person may get a ride in a friend's vehicle or in a rideshare; and a family that has multiple drivers and multiple vehicles may switch which vehicle each person drives on any given day.

This disclosure describes uploading mobile device 108 telematics data at a certain time or milestone in a trip, which triggers a query to the connected vehicle 110 for certain information. At the outset, the mobile device 108 can collect telematics information during a trip. (702) Telematics information during a trip includes information at the outset of the trip and at the end of the trip, such as position and time information. As shown in FIG. 6, at time $t_{start}$, the mobile device 108 can record position information (e.g., latitude and longitude) with a timestamp $t_{start}$. As the mobile device 108 traverses a path during a trip, the position of the mobile device 108 changes as a function of time. At the end of the trip (in this example), the mobile device 108 can record a position (e.g., latitude and longitude) and a timestamp $t_{end}$. The mobile device 108 can upload the position information and timestamp along with other telematics information about the trip to the server 102 using the network 106. (704) The server 102 can query the connected vehicle 110 for position information at time $t_{end}$+C, where C is a predetermined amount of time (e.g., one second, five seconds, etc.). (706) Time value C can be selected to ensure that the connected vehicle can be queried prior to the connected vehicle moving again to start another trip. In some embodiments, the mobile device 108 can query the connected vehicle 110. (716).

The connected vehicle 110 can send telematics information to the server. (708). Or the connected vehicle 110 can send telematics information to the mobile device 108, which send the information to the server 102. (718). In any case, the telematics information for the connected vehicle about the trip is received by the server 102.

The server 102 can use the position information at time $t_{end}$ associated with the mobile device and the position information received from the connected vehicle 110 at time $t_{end}$+C to verify that the mobile device 108 and the connected vehicle 110 are coincident (at the same or substantially the same position based on a comparison of longitude and latitude and time). (710)

After the server 102 verifies that the mobile device 108 is coincident with the connected vehicle 110, the server 102 can verify that the mobile device 108 is reporting information that pertains to the trip taken by the connected vehicle 110. (712) The data elements that support matching mobile phone data and connected vehicle data include:

Latitude/longitude/timestamp data (as described before);

Bluetooth device characteristics (e.g., name and UUID) recorded by the mobile phone from Bluetooth devices connected during a drive vs connected vehicle make/model derived from VIN; and Change in odometer readings between consecutive connected vehicle queries vs distance estimated from mobile phone data.

Each possible match of the mobile phone data with possible connected vehicles can be scored in a probabilistic manner by establishing the relative likelihood of discrete outcomes:

The mobile phone was not in a connected vehicle: the likelihood of this event can be an a priori parameter.

The mobile phone was in connected vehicle A, B, . . . n: the likelihood of each possible matching can be calculated as the product of the probability P of the observed data given the event:

P (bluetooth data from mobile|positive match to vehicle A);

P (difference in odometer delta vs mobile distance|positive match to vehicle A);

P (distance between mobile phone location and vehicle location|positive match to vehicle A);

Etc.

In order to minimize the number of connected vehicle data requests, the system can learn over time the "primary" vehicle associated with each mobile phone. The system will preferentially query the "primary" connected vehicle associated with the mobile phone and then only after determining no positive match to the "primary" connected vehicle the system will move on to query other connected vehicles associated with the same insurance policy (i.e. other vehicles in the same family or fleet of vehicles).

In some embodiments, the mobile device 108 can send identification information for the owner of the mobile device 108 or an authorized user of the mobile device 108. The vehicle information that is reported can include a VIN for the connected vehicle. The identification of the owner/user of the mobile device 108 can be compared against known registration information of the connected vehicle using the VIN or other vehicle identification information. While not dispositive, matching a driver/authorized user with a vehicle can be used to correlate telematics data accumulated by the mobile device with the connected vehicle for the trip.

Telematics information about a trip received from a mobile device can be assigned a VIN associated with a connected vehicle. For example, after receiving the telematics or other vehicle information from the connected vehicle, a VIN can be identified from the other vehicle information. The VIN can then be associated with the received corresponding telematics information from the mobile device.

The matching of the mobile device telematics information with the connected vehicle is to be globally consistent and probabilistic so that a confidence for potential matches can be assessed. Known information about multiple connected/unconnected vehicles in the same family can be leveraged to increase the likelihood of matching mobile device telematics data with a connected vehicle. In addition, known driving habits about family members and each member's vehicle can also be used to increase the likelihood of a match. (For example, it might be known from historical data that a certain family member drives the same car to work each day.)

The possible associations of trips from mobile devices in the same family to connected vehicles in the family can be represented as a bipartite graph and then the most-likely associations can be determined as the min-cost matching in that graph. A trips get assigned a VIN from the vehicle the trip matches to.

This graphical approach to "data association" can handle problems in object tracking. The graph looks like:
- trip nodes are on the left side of the graph and represent (location, time) tuples of the mobile app at particular points in the trip (start, middle, end);
- vehicle nodes are on the right side of the graph and represent (location, time) tuples of the vehicle as queried from the connected vehicle;
- edges in the graph connect trip nodes to vehicle nodes and carry a cost equal to the negative log likelihood (NLL) of the association. This would use simple spatial kinematic models to align the vehicle data in time with the mobile app data (again standard approaches in tracking domain).

A globally valid matching is one where each trip is matched to one and only one vehicle node and each vehicle node can match to one or more trips. The cost of a matching is the sum of the NLL of all of the edges in the matching.

Network algorithms can be used to select the min-cost matching and even the K-best matchings (which lets us estimate the relative probability of the K-best matches and gives us a confidence model for matches).

Noteworthy is that the mobile device 108 does not need to wait until the end of the trip to upload telematics information, and, consequently, the query to the connected vehicle 110 does not have to occur at the end of the trip. The mobile device 108 can make a call to an aggregator at the back end and upload telematics information at predetermined intervals, milestones, elapsed time, preset positions, events, etc. When the mobile device 108 uploads the telematics information, that is the trigger for the query of the connected vehicle data. The query can come from the server 102 or the mobile device 108. The connected vehicle 110 can send data directly to the server 102 or to the mobile device 108. The more times the mobile device uploads information and the more times the connected vehicle reports information, the more accurate the determination of coincidence becomes. However, the reporting interval is limited by the bandwidth and over-sampling issues described above.

After the server 102 verifies that the mobile device 108 was in the connected vehicle 110 during the trip (and consequently, that the received telematics data collected from time $t_{start}$ to time $t_{end}$ corresponds to telematics data for the trip), the server 102 can use that telematics information to characterize driving behaviors and perform a risk assessment. (714)

In one example use case, the mobile device information can be used not only to determine driving behaviors, but also whether the mobile device was being used by the driver during the trip. Mobile device use by a driver is an important and increasingly common causal risk factor for collisions. For example, texting, conducting a phone call, browsing the internet, or watching videos while driving are distractions for drivers that increase the likelihood of an accident. The sensors on the mobile device 108 can detect those behaviors. For example, by looking at data from the location, accelerometer, and gyroscope sensors in a mobile phone and at signals from the phone operating system, it is possible to accurately identify time periods where the person is driving and holding their phone (vs the phone being stationary in a bag, cup holder, or phone mount).

Combining the driving risk signals from the mobile phone and the connected vehicle together make it possible to apply more granular and specific risk models, and more accurately assess the risk that is incurred by the actions of a driver in a specific vehicle. The risk assessment from such a model would be more accurate than a model that estimates the risk based on the driver's actions in a generic vehicle. For example, a harsh braking event that was activated by an automated vehicle safety system might be due to a situation not in the driver's control (i.e. a person running into the roadway), and therefore should be weighed less severely in the overall risk assessment.

Other techniques can be used to link telematics information collected by a mobile device during a trip and a corresponding vehicle. For example, a user can scan a VIN number of a vehicle prior to starting the trip using a telematics application instance running on the mobile device. The VIN can be linked to the telematics information that is collected during the trip and that is reported to the server periodically and/or at the end of the trip. In some embodiments, a mobile device that is plugged into the vehicle can automatically get vehicle information, such as VIN, or, in some cases, get telematics information directly from the vehicle during the trip. The mobile device can report that telematics information it senses and receives from a sensor tag and include the corresponding vehicle information at the same time.

Figure 8:
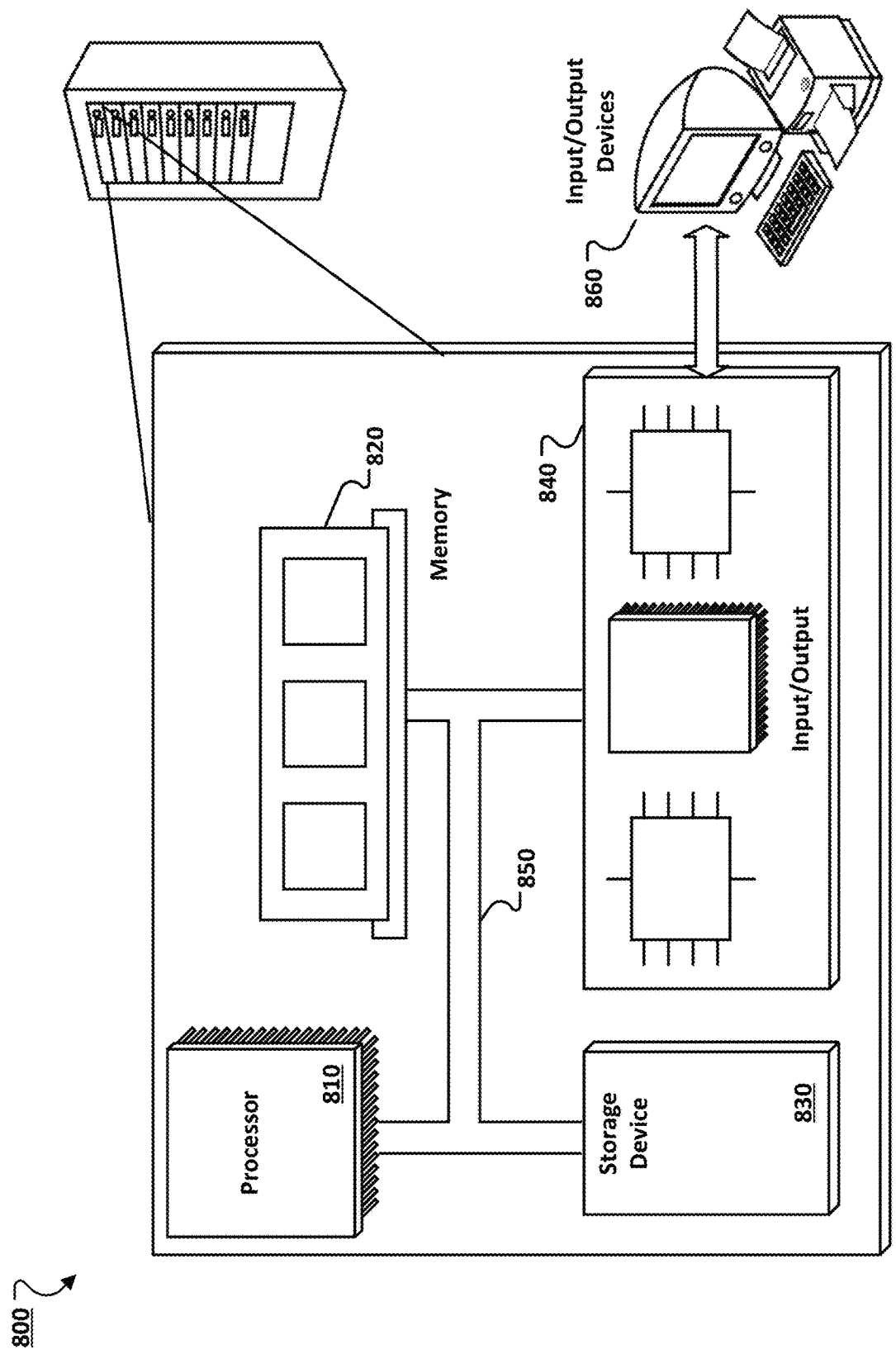
FIG. 8 is a block diagram of an example computer system in accordance with embodiments of the present disclosure.

FIG. 8 is a block diagram of an example computer system 800. For example, referring to FIG. 1, the mobile device 102, tag device 104, and data processing system 108 could be an example of the system 800 described here, as could a computer system used by any of the users who access resources of these components. The system 800 includes a processor 810, a memory 820, a storage device 830, and one or more input/output interface devices 840. Each of the components 810, 820, 830, and 840 can be interconnected, for example, using a system bus 850.

The processor 810 is capable of processing instructions for execution within the system 800. The term "execution" as used here refers to a technique in which program code causes a processor to carry out one or more processor instructions. In some implementations, the processor 810 is a single-threaded processor. In some implementations, the processor 810 is a multi-threaded processor. The processor 810 is capable of processing instructions stored in the memory 820 or on the storage device 830. The processor 810 may execute operations such as those described with reference to other figures described herein.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including one or more physical storage devices distributed on a network and accessed using a network. In some examples, the storage device may store long-term data. The input/output interface devices 840 provide input/output operations for the system 800. In some implementations, the input/output interface devices 840 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 800 to communicate, for example, transmit and receive data. In some implementations, the input/output device can include driver devices configured to receive input data and send output data to other input/output devices, e.g., keyboard, printer and display devices 860. In some implementations, mobile computing devices, mobile communication devices, and other devices can be used.

A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 800 is contained within a single integrated circuit package. A system 800 of this kind, in which both a processor 810 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 840.

Although an example processing system has been described in FIG. 8, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A computer-implemented method comprising:
receiving, by at least one processor and from a mobile device, first trip information recorded by an application executing on the mobile device during a trip that may have been undertaken by a connected vehicle, the first trip information including a first location of the connected vehicle and first telematics data for the trip;
in response to receiving the first trip information from the mobile device, transmitting, by the at least one processor, a request for second trip information collected from the connected vehicle, wherein the request is transmitted within a threshold time of receiving the first trip information from the mobile device;
receiving, by the at least one processor, the second trip information, the second trip information including a second location of the connected vehicle and second telematics data for the trip that is different from the first telematics data;
determining, by the at least one processor, that the first location of the connected vehicle is within a threshold distance of the second location of the connected vehicle;
verifying, by the at least one processor, that the mobile device was in the connected vehicle during the trip based at least in part on the determination that the first location of the connected vehicle is within the threshold distance of the second location of the connected vehicle; and
in response to verifying that the mobile device was in the connected vehicle during the trip,
generating, by the at least one processor, an assessment for the connected vehicle or a driver of the connected vehicle using the first telematics data included in the first trip information and the second telematics data included in the second trip information,
wherein transmitting the request within the threshold time of receiving the first trip information from the mobile device improves the accuracy of verifying that the mobile device was in the connected vehicle during the trip, relative to transmitting the request after the threshold time, thereby facilitating a data association among the first trip information and the second trip information.

2. The method of claim 1, wherein verifying that the mobile device was in the connected vehicle during the trip comprises determining that at least some of the first trip information matches with at least some of the second trip information.

3. The method of claim 1, wherein the first trip information comprises a first position and a first timestamp and the second trip information comprises a second position and a second time stamp;
the method further comprising:
comparing the first position and the first timestamp against the second position and the second time stamp; and
determining that the first position and the second position are substantially similar;
determining that the first timestamp and the second timestamp are substantially similar; and
verifying that the mobile device and the connected vehicle were at the substantially same position at a time corresponding to the first and second timestamps.

4. The method of claim 1, wherein the first trip information comprises a distance traveled by the mobile device during the trip and the second trip information comprises an odometer reading for the connected vehicle for the trip;
the method comprising:
comparing a distance traveled by the mobile device during the trip against the odometer reading; and
determining that the distance traveled by the mobile device during the trip is substantially the same as the odometer reading; and
determining that the mobile device was in the connected vehicle during the trip based on the comparison of the distance traveled by the mobile device and the odometer reading being substantially the same.

5. The method of claim 1, wherein the first trip information comprises an indication of a Bluetooth device the mobile device was connected to during the trip and the second trip information comprises an indication of a Bluetooth device the connected vehicle was connected to during the trip;
the method comprising determining that the mobile device was in the connected vehicle based on the mobile device being connected to the connected vehicle via a Bluetooth connection during the trip.

6. The method of claim 1, wherein transmitting a request for second trip information collected by the connected vehicle comprises transmitting the request for the second trip information to the connected vehicle.

7. The method of claim 1, wherein the second trip information is received from the connected vehicle.

8. The method of claim 1, wherein the second trip information is received from the mobile device.

9. The method of claim 1, wherein generating the assessment comprises:
applying one or more of the first telematics data included in the first trip information or the second telematics data included in the second trip information to a model to generate the assessment for the connected vehicle or the driver of the connected vehicle.

10. The method of claim 1, comprising:
in response to verifying that the mobile device was in the connected vehicle during the trip,
identifying, by the at least one processor, vehicle information for the connected vehicle;
selecting, by the at least one processor, a processing model from a plurality of processing models based on the vehicle information; and
generating, by the at least one processor, the assessment for the connected vehicle or the driver of the connected vehicle using the selected model.

11. The method of claim 1, comprising:
in response to verifying that the mobile device was in the connected vehicle during the trip,
identifying, by the at least one processor and based on the first trip information, at least one telematics event at the connected vehicle;
determining, by the at least one processor and based on the second trip information, that the at least one telematics event is substantially coincident with activation of a system of the connected vehicle; and
generating, by the at least one processor, the assessment for the connected vehicle or the driver of the connected vehicle based on the at least one telematics event and the determination that the at least one telematics event is substantially coincident with activation of the system of the connected vehicle.

12. One or more non-transitory computer-readable storage media comprising instructions that, when executed, cause one or more hardware processors to perform operations comprising:
receiving, at a server and from a mobile device, first trip information recorded by an application executing on the mobile device during a trip that may have been undertaken by a connected vehicle, the first trip information including a first location of the connected vehicle and first telematics data for the trip;
in response to receiving the first trip information from the mobile device, transmitting a request for second trip information collected from the connected vehicle, wherein the request is transmitted within a threshold time of receiving the first trip information from the mobile device;
receiving the second trip information, the second trip information including a second location of the connected vehicle and second telematic data for the trip that is different from the first telematics data;
determining that the first location of the connected vehicle is within a threshold distance of the second location of the connected vehicle;
verifying that the mobile device was in the connected vehicle during the trip based at least in part on the determination that the first location of the connected vehicle is within the threshold distance of the second location of the connected vehicle; and
in response to verifying that the mobile device was in the connected vehicle during the trip,
generating an assessment for the connected vehicle or a driver of the connected vehicle using the first telematics data included in the first trip information and the second telematics data included in the second trip information,
wherein transmitting the request within the threshold time of receiving the first trip information from the mobile device improves the accuracy of verifying that the mobile device was in the connected vehicle during the trip, relative to transmitting the request after the threshold time, thereby facilitating a data association among the first trip information and the second trip information.

13. The one or more non-transitory computer-readable storage media of claim 12, wherein verifying that the mobile device was in the connected vehicle during the trip comprises determining that at least some of the first trip information matches with at least some of the second trip information.

14. The one or more non-transitory computer-readable storage media of claim 12, wherein the first trip information comprises a first position and a first timestamp and the second trip information comprises a second position and a second time stamp;
the operations comprising:
comparing the first position and the first timestamp against the second position and the second time stamp; and
determining that the first position and the second position are substantially similar;
determining that the first timestamp and the second timestamp are substantially similar; and
verifying that the mobile device and the connected vehicle were at the substantially same position at a time corresponding to the first and second timestamps.

15. The one or more non-transitory computer-readable storage media of claim 12, wherein the first trip information comprises a distance traveled by the mobile device during the trip and the second trip information comprises an odometer reading for the connected vehicle for the trip;
the operations comprising:
comparing a distance traveled by the mobile device during the trip against the odometer reading; and
determining that the distance traveled by the mobile device during the trip is substantially the same as the odometer reading; and
determining that the mobile device was in the connected vehicle during the trip based on the comparison of the distance traveled by the mobile device and the odometer reading being substantially the same.

16. The one or more non-transitory computer-readable storage media of claim 12, wherein the first trip information comprises an indication of a Bluetooth device the mobile device was connected to during the trip and the second trip information comprises an indication of a Bluetooth device the connected vehicle was connected to during the trip;
the operations comprising determining that the mobile device was in the connected vehicle based on the mobile device being connected to the connected vehicle via a Bluetooth connection during the trip.

17. The one or more non-transitory computer-readable storage media of claim 12, wherein transmitting a request for second trip information stored on the connected vehicle comprises transmitting the request for the second trip information to the connected vehicle.

18. A system comprising:
one or more hardware processors, and
a memory comprising instructions that when executed cause the one or more hardware processors to perform operations comprising:
receiving, from a mobile device, first trip information recorded by an application executing on the mobile device during a trip that may have been undertaken by a connected vehicle, the first trip information including a first location of the connected vehicle and first telematics data for the trip;
in response to receiving the first trip information from the mobile device, transmitting a request for second trip information collected from the connected vehicle, wherein the request is transmitted within a threshold time of receiving the first trip information from the mobile device;
receiving the second trip information, the second trip information including a second location of the connected vehicle and second telematics data for the trip that is different from the first telematics data;
determining that the first location of the connected vehicle is within a threshold distance of the second location of the connected vehicle;
verifying that the mobile device was in the connected vehicle during the trip based at least in part on the determination that the first location of the connected vehicle is within the threshold distance of the second location of the connected vehicle; and
in response to verifying that the mobile device was in the connected vehicle during the trip,
generating an assessment for the connected vehicle or a driver of the connected vehicle using the first telematics data included in the first trip information and the second telematics data included in the second trip information,
wherein transmitting the request within the threshold time of receiving the first trip information from the mobile device improves the accuracy of verifying that the mobile device was in the connected vehicle during the trip, relative to transmitting the request after the threshold time, thereby facilitating a data association among the first trip information and the second trip information.

19. The system of claim 18, wherein the first trip information comprises a distance the mobile device travelled during the trip; and wherein the second trip information comprises an odometer reading for the trip.

20. The system of claim 18, wherein the first trip information comprises an indication of a Bluetooth device that the mobile device was connected to during the trip; and wherein the second trip information comprises an indication of a Bluetooth device the connected vehicle was connected to during the trip.

* * * * *